United States Patent
Bloom

[15] 3,693,966
[45] Sept. 26, 1972

[54] LAPPING AND ALIGNING OF PROFILED SHEETS

[72] Inventor: Martin S. Bloom, Stockton-on-Tee, England

[73] Assignee: Imperial Chemical Industries Limited, London, England

[22] Filed: June 21, 1971

[21] Appl. No.: 154,844

[30] Foreign Application Priority Data

July 6, 1970 Great Britain..........32,670/70

[52] U.S. Cl..................271/1, 156/566, 271/DIG. 8
[51] Int. Cl..............................B65h 5/00, B65c 9/00
[58] Field of Search............198/35; 271/8, 46, 1, 51; 156/269, 566

[56] References Cited
UNITED STATES PATENTS 1,986,023   1/1935   Staude..................271/DIG. 8

Primary Examiner—Richard E. Aegerter
Attorney—Cushman, Darby & Cushman

[57] ABSTRACT

Method for aligning and lapping moving profiled sheets fed successively to a roller conveyor, including automatically aligning each successive sheet on the conveyor and maintaining the alignment by downwardly pressing guide rollers, accelerating each sheet in succession off the conveyor onto an adjacent carrier substrate located higher than the conveyor so that the leading end of any succeeding sheet is lapped by the trailing end of the immediately preceding sheet to a predetermined extent.

10 Claims, 4 Drawing Figures

PATENTED SEP 26 1972

Inventor
MARTIN S. BLOOM
By Cushman, Darby & Cushman
Attorneys

LAPPING AND ALIGNING OF PROFILED SHEETS

The present invention relates to a method and apparatus for lapping and aligning successive moving profiled sheets, particularly but not exclusively intended as the bottom skins or facings in foam laminates of the kind comprising a rigid layer of foam (in particular foamed polyurethane, polyvinylidene chloride, urea formaldehyde, epoxy resins, polyethylene or polystyrene) confined between upper and lower skins or facings. Foam laminates of the kind described are useful as structural units and insulating material (e.g., in the building and packaging industries) and various processes for their manufacture (including continuous processes) have been proposed, for example in prior British Patent Nos: 997,086, 1,023,164 (U.S. Pat. Nos. 3,369,065,) 1,098,472, 1,098,473 and 1,053,192 (U.S. Pat. No. 3,537,929).

In particular, said prior British Patent No. 1,053,192 (U.S. Pat. No. 3,537,929) describes and claims a process for the continuous manufacture of foam laminates consisting of a foam layer of uniform texture confined between two skins of differing predetermined surface contours which process comprises passing a first flexible skin having a surface of a predetermined desired shape continuously through guiding means underneath a foam dispenser, depositing an even layer of nascent foam on said first skin, while the latter either is sufficiently rigid in itself or by means of supports is made sufficiently rigid to impart its own shape to the underside of the foam, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam surface on to a second skin having a non-planar surface of a predetermined shape and travelling at the same speed and in the same direction as and in close proximity to and underneath the inverted first skin-foam laminate and causing said foam to fully cure and bond to both skins. According to said prior British Patent No. 1,053,192 (U.S. Pat. No. 3,537,929), the nascent foam may be a polyurethane foam, or the foam may be formed from polystyrene, polyvinylidene chloride, urea formaldehyde, epoxy resins or polyethylene. Further, according to said patent, said second non-planar skin onto which the foam is inverted, may be a metal sheet having reinforcing grooves or reinforcements, and said first flexible skin may be, for example, a continuous paper sheet or laminate, plastics film, sheet metal, metal foil (e.g., aluminum foil), or a sheet of textile-reinforced plastics comprising a woven or non-woven textile substrate made of a material selected from the group consisting of cotton, jute, rayon, nylon, polyethylene terephthalate, glass fiber and polypropylene and mixtures thereof, bonded with and at least partly embedded in a flexible plastics material selected from the group consisting of polyvinyl chloride, nitro-cellulose, acrylonitrile-butadiene-styrene copolymers and natural and synthetic rubbers formulated with plasticizers, stabilizers, anti-oxidants, fillers and other additives for said textile-reinforced plastics sheet. If desired, said first flexible skin may be stripped off its adjacent foam surface after the foam has fully cured.

It will be appreciated that, in a continuous process for the manufacture of foam laminates of the kind described in which the bottom facings are discrete profiled sheets which are fed successively to the laminating step, it is necessary to ensure that the side edges (and, hence, the profiles) of successive sheets are in very accurate alignment with one another and that the adjacent ends of successive sheets are lapped to a predetermined extent (with their respective profiles nesting within one another). If successive sheets are so aligned and lapped before they are fed to the laminating step, then the foam portion of the resulting continuous foam laminate can subsequently be sawed, or otherwise cut, to a very close and very consistent tolerance so as to produce individual laminates all equally and very accurately dimensioned. Without the aforementioned aligning and lapping, it would be impossible to produce consistently uniform laminates, and an unacceptably high percentage of them would inevitably have to be rejected as substandard.

Briefly, we achieve our object by feeding individual profiled sheets (e.g., corrugated or grooved sheets, preferably of metal) in rapid succession onto a roller conveyor which conveys them in the direction of the laminating step. The rollers of the roller conveyor are mounted at a slight angle to the direction of travel and this causes each successive sheet to move slightly sideways, while it is being conveyed forwards, until its longitudinal edge comes into contact with an alignment fence, at which time the sheet is correctly positioned upon the conveyor. It is maintained in this correct position by guide rollers, shaped to substantially the same profile as the sheet, which press down upon the top surface of the sheet. At the same time, the roller conveyor continues to convey the sheet forward, and as the leading end of the sheet approaches the forward end of the roller conveyor the forward movement of the sheet is temporarily speeded up and the sheet is passed forwardly onto a forwardly moving carrier or paper or like substrate, and its correct position is maintained thereon by further guide rollers shaped to substantially the same profile as the sheet and pressing downwardly thereon. Where the sheet leaves the roller conveyor and moves onto the carrier paper, the latter passes over a spindle or the like which is located very slightly higher than the roller conveyor. Consequently, as the leading end of the sheet reaches the spindle it is deflected very slightly upwardly onto the carrier paper. MOre important, however, as its trailing end nears the spindle, it too is deflected very slightly upwardly and, at the same moment, the forward movement of the leading end of the succeeding sheet on the roller conveyor is temporarily speeded up and conveyed faster than the trailing end of the preceding sheet so that its leading end slips under the momentarily uplifted trailing end of the preceding sheet, so that the two sheets are now lapped. To ensure, however, that they are lapped to the correct predetermined extent, just prior to its being transferred off the roller conveyor, a spacer clip is slipped over the leading end of the succeeding sheet. This spacer clip grips the leading end of the succeeding sheet and, on its upper side, terminates in an upstanding stop member located a predetermined distance behind the leading end of the succeeding sheet. Consequently, when the trailing end of the preceding sheet and the leading end of the succeeding sheet become lapped (as described above) the upstanding stop member comes up against the trailing end of the preceding sheet and ensures that the two sheets are only lapped to a predetermined extent (equal, in fact, to the distance between the leading end of the succeeding sheet and the upstanding stop member of the spacer clip). From then on, both sheets proceed forward at the same speed.

The present invention accordingly provides a method of aligning and lapping successive moving profiled sheets, which comprises the steps of feeding successive sheets to a roller conveyor, automatically aligning each successive sheet upon the conveyor, maintaining the sheet in alignment by guide rollers adapted to press down upon the aligned sheet, transferring the aligned sheet off the conveyor onto a carrier substrate located adjacent to and higher than the forward end of the conveyor so that the trailing end of one sheet is located higher than the leading end of the succeeding sheet, and transferring the succeeding sheet off the conveyor so that its leading end is lapped by the higher trailing end of the first sheet. Preferably the invention includes the step of affixing a spacer clip to the leading end of the succeeding sheet, so that when the succeeding sheet is transferred off the conveyor and its leading end is lapped by the higher trailing end of the first sheet, the trailing end of the first sheet is engaged by the spacer clip.

The invention also provides apparatus for aligning and lapping successive moving profiled sheets, which comprises means for feeding successive sheets to a roller conveyor adapted to align each successive sheet upon the conveyor, guide rollers adapted to maintain the sheet in alignment by pressing down thereupon, the conveyor being provided with further rollers adapted to transfer the aligned sheet of the conveyor onto a carrier substrate located adjacent to and higher than the forward end of the conveyor so that the trailing end of one sheet is located higher than the leading end of the succeeding sheet, so that when the succeeding sheet is transferred off the conveyor its leading end is lapped by the higher trailing end of the first sheet. Preferably the apparatus includes a spacer clip adapted to be affixed to the leading end of the succeeding sheet, so that when the succeeding sheet is transferred off the conveyor its leading end is lapped by the trailing end of the first sheet which is engaged by the spacer clip.

One embodiment of the invention is illustrated in the accompanying drawings, wherein.

Figure 1:
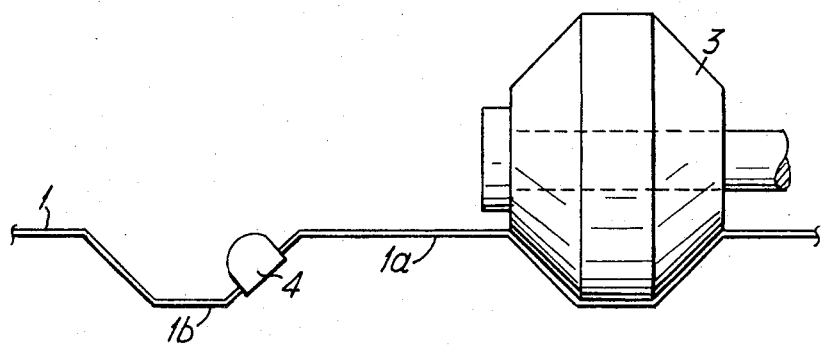
FIG. 1 is an end view of a suitable profiled metal sheet for use in the invention, showing also a guide roller and a spacer clip for use therewith.

In the drawings, a typical profiled metal sheet 1 is provided with crests 1a and troughs 1b. (In FIGS. 2 and 3, a second profiled metal sheet 2 is identical with sheet 1). Guide rollers 3 engage, and bear down upon, the troughs 1b and (once the sheet 1 has been aligned) maintain the sheet 1 in alignment. A spacer clip 4 (illustrated more clearly in FIG. 3) can be slipped over the leading edge of one of the troughs 1b.

Figure 2:
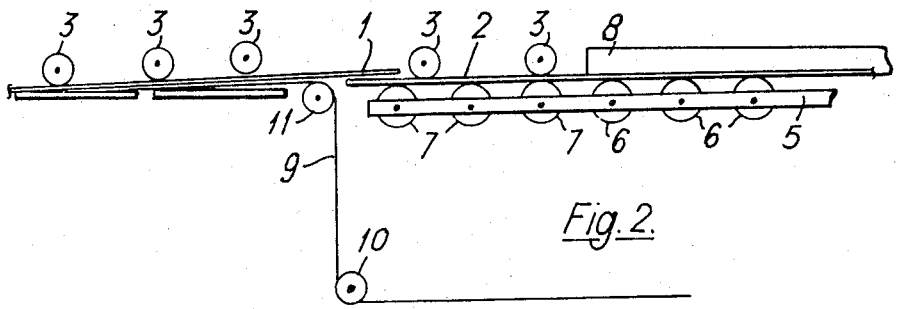
FIG. 2 is a diagramatic view illustrating how successive profiled sheets are aligned and lapped.

Turning to FIG. 2, a pair of successive similar profiled metal sheets 1, 2, are shown being moved in the direction of the arrow A towards a laminating machine(not shown). The second sheet 2 is shown as being still in he process of being propelled forward by a roller conveyor 5 provided with sets of rollers 6, 7. The rollers 7 move faster than the rollers 6. The rollers 6 are set at a slight angle to the direction of travel (in known fashion) so that as the sheet 2 travels forward it also travels slightly sideways until one of its longitudinal edges abuts against an alignment fence 8; the sheet 2 is now correctly aligned and is maintained in alignment by the guide rollers 3, which bear down upon the troughs in the profiled sheet (as in FIG. 1). As the leading end of the sheet 2 nears the forward end of the roller conveyor, the faster rollers 7 cause it, temporarily, to move faster than, and to overtake, the preceding sheet 1.

The preceding sheet 1 has, of course, already been aligned by the roller conveyor 5 and has travelled forward onto a carrier substrate 9 (e.g., paper) which conveys it forward towards the laminating machine. The carrier substrate passes over spindles or the like 10, 11, the uppermost of which (11) is located near the forward end of the roller conveyor 5. The spindle 11 is also located very slightly higher than the forward end of the roller conveyor 5. This means, of course, that as sheet 1 was transferred to the carrier substrate 9, first its leading end and eventually its trailing end were lifted slightly above the level of he leading end of sheet 2, with the result that the leading end of sheet 2 slips under the trailing end of sheet 1 and the two sheets become lapped (as shown in FIG. 2).

Figure 3:
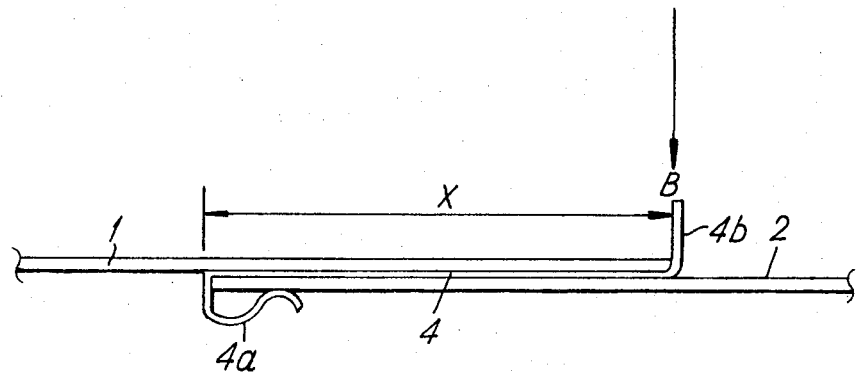
FIG. 3 illustrates a pair of successive profiled sheets lapped to a predetermined extent by the spacer clip.

However, to maintain the sheets 1, 2 not only lapped, but also lapped to a predetermined extent, a spacer clip 4 clipped over one of the troughs in the leading end of sheet 2 just before it is transferred off the roller conveyor 5. The clip 4 (shown in FIg. 3) includes a hooked end 4a which snap-fits onto the leading end of one of the troughs of sheet 2 and an upstanding stop member 4b which is located a short distance rearwardly of the leading end of sheet 2. As the leading end of sheet 2 moves under the trailing end of sheet 1(as shown in FIG. 2), the stop member 4b comes up against the trailing end of sheet 1 (as shown in FIG. 3) so that sheet 2 is unable to move any further relative to sheet 1. The two sheets are now not only correctly aligned but are lapped by a distance X (FIG. 3) which distance is constant for all successive sheets if all the spacer clips used are of constant length.

Figure 4:
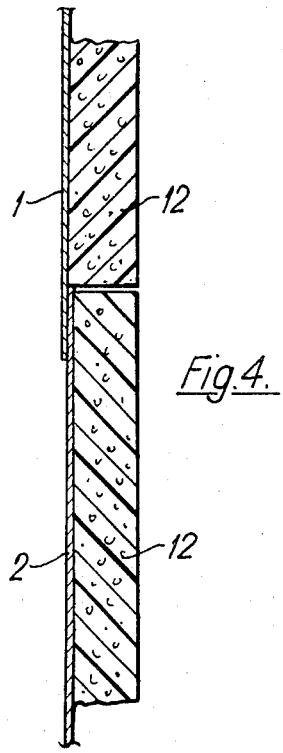
FIG. 4 illustrates a pair of foam laminates with their profiled sheets overlapping to form a continuous structure.

Consequently, it is possible to feed to the laminating machine a constant succession of accurately aligned and accurately lapped bottom facings, which are then used to produce a continuous foam laminate of the kind described. After curing, the foam portion of the continuous foam laminate requires to be sawn or otherwise cut (by methods known per se) to produce individual laminates of predetermined size, and if this cut is made coincident with the trailing end of the upper of two lapped sheets (i.e., along the line of the arrow B in FIG. 3) consistently accurate individual laminates will be obtained. A pair of such laminates are shown overlapped (as though to form a wall, for example) in FIG. 4., with their foam portions 12 abutting one another, and their facing sheets 1, 2 overlapping. Not only are all the parts accurately aligned and dimensioned, but it will be observed that the overlapping portion of the facing sheets 1, 2 (corresponding to the distance X in FIG. 3) covers and protects the join between the abutting foam portions 12.

It will be appreciated that, although the invention has been described herein with particular reference to the aligning and lapping of successive moving profiled sheets for use in the manufacture of foam laminates, it is equally applicable in all circumstances where accurate aligning and lapping of successive moving profiled sheets are required.

I claim:

1. Method of aligning and lapping moving profiled sheets which are fed successively to a roller conveyor, which comprises the steps of automatically aligning each successive sheet upon the conveyor, maintaining the sheet in alignment by guide rollers adapted to press down upon the aligned sheet, transferring the aligned sheet off the conveyor onto a carrier substrate located adjacent to and higher than the forward end of the conveyor so that the trailing end of one sheet is located higher than the leading end of the succeeding sheet, and transferring the succeeding sheet off the conveyor so that its leading end is lapped by the higher trailing end of the first sheet.

2. Method as claimed in claim 1, including the step of affixing a spacer clip to the leading end of the succeeding sheet, so that when the succeeding sheet is transferred off the conveyor and its leading end is lapped by the higher trailing end of the first sheet, the trailing end of the first sheet is engaged by the spacer clip.

3. Method as claimed in claim 1, including the step of mounting the rollers of the roller conveyor at an angle to the direction of travel of the sheets in order to align each successive sheet upon the conveyor against an alignment fence.

4. Method as claimed in claim 1, including the step of passing the carrier substrate over spindle means located adjacent to and higher than the forward end of the conveyor.

5. Method as claimed in claim 1, including the step of moving the conveyor rollers near the forward end of the conveyor faster than the remainder of the conveyor rollers.

6. Apparatus for aligning and lapping moving profiled sheets fed successively to a roller conveyor, including means for aligning each successive sheet upon the conveyor, guide rollers adapted to maintain the sheet in alignment by pressing down thereupon, further rollers provided on the conveyor for transferring the aligned sheet off the conveyor onto a carrier substrate, the carrier substrate being located adjacent to and higher than the forward end of the conveyor so that the trailing end of one sheet is located higher than the leading end of the succeeding sheet and when the succeeding sheet is transferred off the conveyor its leading end is lapped by the higher trailing end of the first sheet.

7. Apparatus as claimed in claim 6, including a spacer clip adapted to be affixed to the leading end of the succeeding sheet, so that when the succeeding sheet is transferred off the conveyor its leading end is lapped by the trailing end of the first sheet which is engaged by the spacer clip.

8. Apparatus as claimed in claim 6, wherein the rollers of the roller conveyor are angled with respect to the direction of travel of the sheets and are thereby adapted to align each successive sheet upon the conveyor against an alignment fence.

9. Apparatus as claimed in claim 6, including spindle means for the carrier substrate, the spindle means being located adjacent to and higher than the forward end of the conveyor.

10. Apparatus as claimed in claim 6, wherein the conveyor rollers near the forward end of the conveyor are adapted to move faster than the remainder of the conveyor rollers.

* * * * *